United States Patent [19]

Gupta

[11] Patent Number: 4,851,280
[45] Date of Patent: Jul. 25, 1989

[54] COMPOSITE TOOLING FOR COMPOSITES MANUFACTURE

[75] Inventor: Dipak Gupta, Hockessin, Del.

[73] Assignee: E. I. Du Pont de Nemours and Company, Wilmington, Del.

[21] Appl. No.: 176,804

[22] Filed: Apr. 1, 1988

[51] Int. Cl.[4] .................. B32B 27/12; B32B 27/28; B32B 31/12; B32B 33/00

[52] U.S. Cl. .................. 428/246; 156/285; 156/286; 156/307.7; 264/DIG. 78; 428/336; 428/408; 428/473.5

[58] Field of Search .................. 156/285, 286, 307.7; 264/DIG. 78; 428/246, 336, 408, 473.5

[56] References Cited

U.S. PATENT DOCUMENTS

| | | | |
|---|---|---|---|
| 3,554,969 | 1/1971 | Long | 260/47 |
| 3,764,449 | 10/1973 | Copeland et al. | 161/88 |
| 4,146,668 | 3/1979 | Dorey et al. | 428/474 |
| 4,336,175 | 6/1982 | Gibbs | 524/726 |
| 4,600,617 | 7/1986 | Cole | 528/188 |

Primary Examiner—James C. Cannon

[57] ABSTRACT

Composite tooling of carbon fiber reinforced polyimide of high Tg is prepared by first curing in an autoclave followed by post-curing in an air circulating oven.

4 Claims, 1 Drawing Sheet

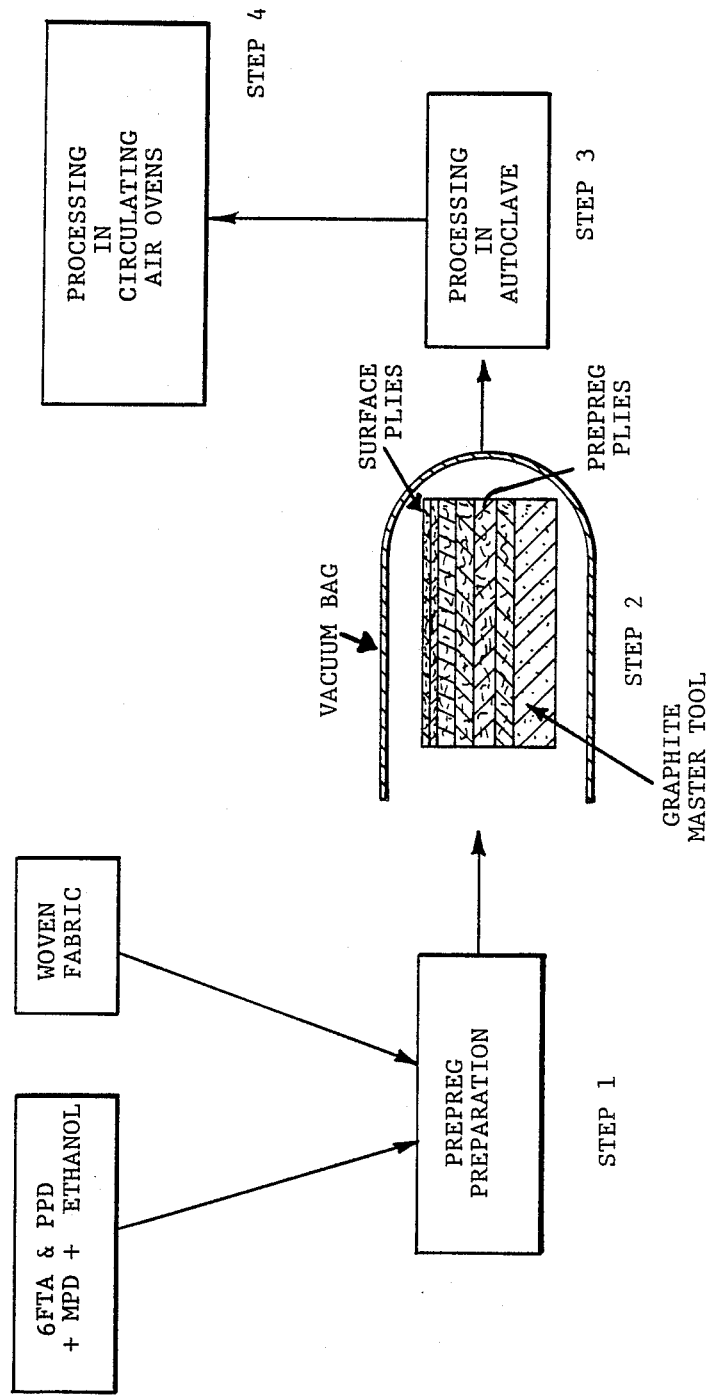

COMPOSITE TOOLING FOR COMPOSITES MANUFACTURE

BACKGROUND OF THE INVENTION

The numerous options that exist today for processing of composite materials has led to diversified technologies. Autoclave processing is most widely used in the aerospace industry. Though this process is generally considered as slow and expensive, it allows the production of parts of various dimensions and shapes for airframe components under closely controlled temperature and pressure conditions.

Autoclave processing conventionally requires use of a tool or mold which supports and/or shapes the composite part in its formation. Thus, there is an initial lay-up of prepreg on the tool, a breather layer is placed over the prepreg and the sandwich inserted in a bag in the autoclave. The bag is evacuated and heat and pressure applied until the part is cured after which it is allowed to cool before removal.

The tool plays an important role in the autoclave process because it has a direct bearing on the quality of the part to be produced. The new high temperature matrix resins used in composites, such as bismaleimides, polyimides and thermoplastics (PEEK) are gaining increased importance in applications requiring high service temperatures. Tools for manufacture of parts from these composites should (1) be capable of repeated cycling above 350° F.; (2) be dimensionally stable at the elevated temperatures; (3) be economical to make and to use, i.e., fast heat-up, and (4) have a low coefficient of thermal expansion that substantially matches the parts to be fabricated.

Current tool materials, such as epoxy/graphite, machined bulk graphite, ceramics and metals are deficient in one or more important respects. The epoxy/graphite tools do not meet the high temperature requirements for processing composites wherein the matrix resin is bismaleimide, polyimide or PEEK. Monolithic graphite is deficient as a tooling material primarily because of its limited durability. It may be used as a master tool but for repeated or multi-use it exhibits many deficiencies. A major concern with ceramic molds is their large thermal mass requiring high heat input to achieve the desired temperature. Among other things, this tends to cause degradation of the vacuum bag and sealant materials. Finally, the most extensively employed tooling materials are metals such as steel, aluminum and nickel. The biggest negative for the metals is their high coefficient of thermal expansion. The mismatch in thermal expansion between metal tools and composite parts promotes distortion of parts. As a result, steel tools are considered adequate only for relatively flat or slightly curved parts which are trimmed to final dimension after cure.

The present invention provides a tool which overcomes most if not all of the aforementioned deficiencies of the prior art tools and possesses still other advantages.

DRAWINGS

The FIGURE depicts the tool manufacturing process of this invention. In Step 1, carbon fiber fabric is combined with impregnating solution to form the prepreg. In Step 2, plies of prepreg are layed-up on a master, and enclosed in a vacuum bag. In Step 3 vacuum is drawn on the bag while external pressure and heat are applied in the autoclave. In Step 4 the tool is post-cured in a circulating air oven.

SUMMARY OF THE INVENTION

This invention provides a composite tool for fiber reinforced high temperature composite manufacture of parts comprising from 35 to 45 volume % of a polyimide consisting essentially of the following recurring structural units:

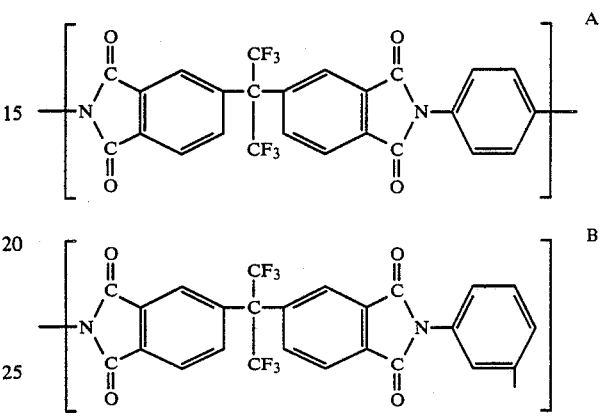

where A is present in an amount of about 95% and B the remainder, and from 55 to 65 volume % of carbon fiber reinforcement, said tool having a porosity of less than 6% and a Tg of at least 730° F. The walls of said tool preferably have a thickness of between 0.1 and 0.25 inches. A preferred tool of the aforementioned type is one having a surface layer of 1 to 3 plies of the same polyimide each ply not exceeding about 4 mils and being reinforced with a 24×24 yarns/in. fabric of about 1000 filament carbon fiber, and wherein the proportion of fiber to matrix resin is substantially the same as in the body of the tool. Alternatively, the surface layer comprises a certain polyimide film of between 0.2 and 0.75 mils thick. The invention also comprises a process for making the composite tool.

DETAILED DESCRIPTION OF THE INVENTION

The novel tool of the present invention is prepared on a master tool made of ceramic or monolithic graphite. Manufacture of the master tool is well known in the art. It will be understood that a male master tool is used to produce a female tool of the invention which in turn is used to make a male composite part.

The tool of the invention is made by first preparing a solution from 2,3-bis(3'4'-dicarboxyphenyl) hexafluoropropanol (6FTA) plug substantially stoichiometric quantities of diamines comprising m-phenylene diamine (MPD) and p-phenylene diamine (PPD) in the molar proportions of about 95% PPD, with the remainder MPD. The particular solvent employed is not critical. Preferably the solvent is ethanol, but N-methylpyrrolidone (NMP), combinations of NMP and ethanol and diglyme can also be used for this purpose. The solvent is ordinarily employed in an amount of from 60 to 70% by volume based on the reactants. Application of heat to the solution produces an aromatic condensation polyimide. These polyimides are linear amorphous polymers, free of crystallinity and essentially non-crosslinked. In the cured form, they are sufficiently thermoplastic to permit melt flow when pressure is applied above the polymer softening point or glass transition temperature (Tg).

The tooling prepreg is prepared by passing a carbon fiber fabric directly through the prepreg solution as by dip-coating, followed by partial drying to the desired level of volatiles. Any of a variety of carbon fiber fabrics may be employed for this purpose. The impregnated fabrics or prepregs are tacky, drapable fabrics which are readily handled in lay-ups. Various weave styles, yarn counts and ply thickness can be used. During heating and curing of the prepreg, solvent is given off as well as water, which is formed in the imidization reaction.

High quality tools are fabricated using the autoclave molding techniques under appropriate environments. The specifics of time, temperature and pressure will vary depending upon the tool dimensions, lay-up configurations, autoclave geometry, e.g., vacuum port placement, vacuum port diameter, etc., with the optimum conditions readily determinable by those skilled in the art.

A typical autoclave procedure is as follows:

1. The monolithic graphite or ceramic master tool is sealed with a high temperature sealant available in the art. A mold release agent (Freekote-44) is applied in several coats, hot air dried each time and then baked at the prescribed temperature.

2. Plies of the tooling prepreg are applied one at a time to the master at desired orientations being careful to work the prepreg into all radii and corners, making sure all entrapped air is removed. Sufficient layers are applied to provide a tool having the desired wall thickness after curing. In the initial lay-up of the prepreg, there are formed pockets of entrapped air, and during the initial heat-up, additional voids are formed as binder solvents and water from the condensation polymerization are evolved. These voids will be substantially eliminated in the subsequent application of autoclave pressure.

3. A porous tetrafluoroethylene film or breather cloth is layed-up over the prepreg plies for debulking. A vacuum bag is placed over the lay-up allowing an excess of film to fill the radii, corners and depressions in the master to avoid bridging and a vacuum of at least 20 inches is employed to debulk the lay-up.

4. The lay-up is then placed in an autoclave and a vacuum source capable of maintaining 4-6 inches Hg vacuum level attached. The vacuum is then applied while the assembly is heated slowly to a temperature in the range of about 200° to 220° F. and held there for 80 to 100 minutes, at which time the assembly is slowly heated to a temperature of about 240° to 260° F. A vacuum of 28 inches is drawn on the bag and a pressure of from 180 to 200 psi is applied to the bag at the elevated temperature and once again the assembly is slowly heated up to about 735° F. and maintained there until it has cured sufficiently to maintain its shape during post-cure, i.e., until a glass transition temperature Tg of between 650° and 700° F. is reached. The assembly is then cooled slowly at about 2°-3° F. per minute to about 300° F. The pressure can then be released and the part removed from the autoclave.

During the heat-up, melt viscosity decreases at first, due to thermal effects alone. Then, with additional heating, molecular weight build up accelerates, more and more solvent is evolved, and the viscosity begins to increase. Consolidation pressure must be applied when the melt viscosity is in the proper range.

Premature pressurization can lead to excessive loss of binder resin which is still too fluid at that point. On the other hand, an excessive delay in the application of consolidation pressure results in a failure to eliminate the voids, because the autoclave pressure alone may be insufficient to overcome the high matrix melt viscosity.

Rather than keeping the assembly in the autoclave at the elevated temperatures until the tool is completely cured, it has been found surprisingly that post curing of the part outside the autoclave gives substantially the same result at reduced costs. Successful removal of the last traces of volatiles in a post cure requires the heat-up rate to be slow enough to allow the remaining volatiles to diffuse through the laminate in a controlled fashion, to avoid excessive internal pressures that can result in delamination or blistering.

The post cured laminates show no blisters, delaminations or surface cracking. They also show excellent retention of flexural strength and flexural modulus. Thus, the partially cured tool assembly may be removed from the vacuum bag of the autoclave and post-cured in a circulating air oven at about 725° F. until curing is complete.

One method of establishing the completeness of cure of a laminate is to determine the glass transition temperature (Tg). The glass transition temperature is defined as the point or narrow region, on the temperature scale where the thermal expansion coefficient undergoes a discontinuity (which is also accompanied by discontinuities in heat capacity).

Using the Du Pont 983 Dynamic Mechanical Analyzer System, the Tg is determined by the point of intersection of the lines drawn tangent to the pre-Tg and post Tg parts of the curve. An even more definitive indication of how a laminate will perform at elevated temperatures is believed to be the "onset temperature". The onset temperature is defined as the point at which the pre-Tg part of the curve starts to depart from linearity. This temperature is usually 15°-20° F. below the Tg in a well cured composite. The heat-up rate in the oven is preferably 5°-10° F. per minute and the cool-down rate 2°-3° F. per minute. Large complex tools are preferably restrained by mechanical means during the post cure cycle to avoid possible dimensional change and the restraint is maintained until the tool is cooled to below 300° F. The slow heating also tends to reduce void content.

High void content in composites causes reduction of mechanical properties. Also, the deterioration of mechanical properties at elevated temperatures proceeds more rapidly because increased surface area accelerates oxidative degradation. Extensive thermal cycling (100 cycles) at 700°-725° F. with the tool of this invention shows very little reduction of flexural strength and almost no loss in flexural modulus. The void levels in the tools of the invention may be determined by a sulfuric acid digestion procedure described below.

Determination of Volume Percent Voids of the Laminate Procedure

1. Sample Preparation and Conditioning:

1.1 Obtain two samples of the material to be tested weighing between 1 and 2 grams. The samples should be representative of the part from which they are removed. Samples shall be smooth on all edges and free of obvious damage such as edge delamination from cutting.

1.2 Place the samples in an air circulating oven set at 230° F. for 1 hour.

2. Density Determination:

2.1 Weigh the conditioned samples to the nearest 0.001 gram.

2.2 Weigh the samples in a tray or pan suspended in water. Make certain that no foreign material or air bubbles stick to the sample.

3. Digestion:

3.1 Place the sample in a clean beaker and add 50 to 75 ml of concentrated sulfuric acid.

3.2 Place the beaker on a hot plate and heat until the acid begins to fume.

3.3 After the solution has become dark, add hydrogen peroxide dropwise down the side of the beaker until about 20 ml has been added. Heat for 5 more minutes. The fibers should float to the top and the solution below the fiber should turn clear. If after 5 minutes the solution is not clear, slowly add more hydrogen peroxide until the solution is clear.

4. Filtering:

4.1 Place a tared glass filtering crucible on a vacuum flask and transfer the fiber and acid to the crucible.

4.2 Wash the sample with sulfuric acid. Pour the acid into the beaker first to make certain that no fiber remains in the beaker.

4.3 Wash the sample two times with boiling water.

4.4 Transfer the crucible to another filtering flask and wash the sample twice with acetone. CAUTION: Never mix acid with acetone.

4.5 Place the crucible in an air circulating oven set at 230° F. for a minimum of one hour to dry.

4.6 Cool the sample in a dessicator and weigh to the nearest 0.001 gram.

| 5. Calculations | |
|---|---|
| 5.1 | Calculate the specimen specific gravity and density. sp. gr. = $w_1/w_1 - w_2$    d = sp.gr. $\times$ .9975 $w_1$ = weight of specimen in air $w_2$ = weight of specimen in water |
| 5.2 | Calculate the sample fiber weight $w_4 - w_3 = w_5$ where $w_3$ = weight of crucible $w_4$ = weight of crucible and fiber $w_5$ = weight of fiber |
| 5.3 | Calculate the weight percent fiber and resin % fiber (wgt) = $w_5/w_1 \times 100$ % resin (wgt) = 100 - % fiber (wgt) |
| 5.4 | Calculate the percent fiber volume % FV = $(w_5/w_1) \times (d_1/d_f)$ where $d_1$ = laminate density $d_f$ = fiber density |
| 5.5 | Calculate the theoretical void free unit volume $V_t = (\% \text{ fiber}/d_f) + (\% \text{ resin}/d_r)$ where $d_r$ = resin density |
| 5.6 | Calculate the laminate measured unit volume $V_1 = 1/d_e$ |
| 5.7 | Calculate the void volume $V_v = V_1 - V_t$ |
| 5.8 | Calculate the volume percent voids of the laminate % voids = $V_v/V_1 \times 100$ |

The tool of this invention, whether it be flat or non-planar, such as a dish, is suitable for repeated use even for high temperature composite part formation. Preferred tools of the invention have a surface layer comprising a "Kapton" polyimide film formed from oxydianiline and pyromellitic dianhydride, or a cured ply of prepreg wherein the reinforcing carbon fiber is in the form of a 24×24 fabric of about 1000 carbon fiber yarn. The surface layer is incorporated by applying the polyimide film or uncured prepreg to the master tool before applying additional plies of prepregs.

The following examples are illustrative of this invention and are not to be construed as limiting.

EXAMPLE 1

Tooling Prepreg

Prepregs were made from woven graphite fiber fabrics and binder solutions which contained stoichiometric quantities of polyimide precursor monomers, i.e., acid and amine, (6FTA, PPD and MPD) in ethanol solvent. The PPD is present in an amount of about 95% of the amine mixture with MPD, the remainder. The binder solutions were prepared at 47–49% cured resin solids (i.e., upon removal of solvent and curing of resin) and had viscosities in the range of 170–216 centipoise at 73° F. Description of the prepregs is found in Table 1. The prepregs were drapable and had good tack for efficient lay-up without trapping much air.

Preparation of Graphite Master

1. Thoroughly seal the machined monolithic graphite master with high temperature sealant and bake at 750° F. for 60 minutes.

2. Apply three coats of high temperature release agent and hot air dry each time to get good release.

Tool Lay-Up Procedure

1. Apply one ply of polyimide film (described above (Du Pont,s "Kapton", 50 HN film, 0.5 mil thickness) which forms the surface ply of the tool. Wipe the film with acetone to remove foreign matter.

2. Apply two plies (one at a time) of Prepreg A (orientation: 0°, 90°).

3. Apply four plies (one at a time) of Prepreg B (orientation: 0°, +45°, -45°, 90°).

4. Place a vacuum bag over the lay-up using Bagging Procedure described below. Debulk the lay-up under a minimum of 20 inches of Hg. vacuum for 5–10 minutes.

5. Apply four plies (one at a time) of Prepreg C. (orientation: 0°, +45°, 90°, -45°).

6 Debulk the lay-up under a minimum of 20 inches of Hg. vacuum for 5–10 minutes.

Bagging Procedure

1. Place one or more thermocouples between center plies of lay-up.

2 Apply two plies of polytetrafluoro-ethylene glass separator.

3. Apply four plies of glass bleeder cloth (Style 7781).

4. Place a vacuum bag over the lay-up allowing an excess of film to fill all radii, corners and depressions in the master.

Autoclave Cure Process

1. Place the lay-up in an autoclave and attach a vacuum source capable of maintaining 5 inches Hg. vacuum level. Apply vacuum.

2. Heat the tool/assembly at a rate of 2° F. per minute to 210° F., and hold at 210° F. for 90 minutes.

3. After the tool/assembly has been for 90 minutes at 210° F., increase temperature to 250° F. at 2° F. per minute.

4. Apply 28 inches Hg. vacuum and 200 psi autoclave pressure while holding at 250° F.

5. Heat the tool/assembly at a rate of 2° F. per minute to 735° F., and hold for 60 minutes at 735° F.

6. Cool the tool/assembly to 350° F. at 3° F. per minute before releasing autoclave pressure and vacuum.

7. Release the pressure and vacuum and remove the tool/assembly from the autoclave.

Post Polymerization/Post Cure Process

The glass transition temperature (Tg) of the tool as autoclave cured was determined to be 685° F. The tool was then post polymerized/post cured at 725° F. in a recirculating air oven to increase the glass transition temperature so that the tool can be utilized to process composites having cure temperatures in excess of 700° F. without distortion of physical dimensions. The post curing was conducted using the following scheme:

1. Remove the tool/assembly from the vacuum bag after the autoclave cure.

2. Insert the tool/assembly into a recirculating air oven.

3. Heat the oven at a rate of 5° F. per minute to 725° F.

4. Hold at 725° F. for 10 hours.

5. Cool the oven at a rate of 5° F. per minute to below 300° F. before taking out the tool/assembly.

The post polymerization/post curing processing resulted in the increase of Tg from 685° F. to 750° F. The density of the tool was about 1.6 g/cc.

Fabrication of Advanced Composite

The tool of this example was utilized to process a composite part requiring a high cure temperature. Unidirectional prepreg tape, carbon fiber (IM6, Hercules) polyimide matrix, ("Avimid" K, Du Pont) was layed-up to prepare a 48 plies part with the following fiber orientation: $(+45°/0°/-45°/90°/90°/-45°/0°/+45°)$, repeated six times.

The tool surface was sprayed with a high temperature release agent (Freekote-33) and hot air dried each time to assure good release of the part after cure. The part assembly was then placed on the tool, vacuum bagged using the procedure previously described and then autoclave cured using the following scheme:

1. Apply 5 inches Hg vacuum.

2. Heat the part/assembly to 350° F. at 1° F. per minute.

3. Apply 28 inches Hg. vacuum while the part/assembly is at 350° F.

4. Heat the part/assembly from 350° F. to 650° F. at 1° F. per minute.

5. Hold the part/assembly at 650° F. for 60 minutes. Apply 185 psi pressure at 10 psi/minute.

6. Cool the part/assembly to 480° F. at 1° F. per minute.

7. Cool the part/assembly from 480° F. to 120° F. at 5° F. per minute.

8. Release the pressure and vacuum and remove the part/assembly from the autoclave.

The part produced had excellent quality and the following properties:

Density, gm/cc = 1.53
TGA Weight Loss (up to 750° F.), % = 0.06
Dry Glass Transition Temp., ° F. = 546

EXAMPLE 2

Tooling Prepregs D, A and C, described in Table 1 were used to fabricate the tool of this example.

Tool Lay Up Procedure

1. Apply three plies (one at a time) of Prepreg D (orientation: 0°, +45°, 90°).

2. Apply four plies (one at a time) of Prepreg A (orientation: 0°, +45°, −45°, 90°).

3. Place a vacuum bag over the lay-up allowing an excess of film to fill the radii, corners and depressions in the graphite master to avoid bridging. Debulk the lay-up under a minimum of 20 inches Hg vacuum for 5–10 minutes.

4. Apply eight plies (one at a time) of Prepreg C, (Orientation: 0°, +45°, 90°, −45°, −45°, 90°, +45°, 0°).

5. Debulk the lay-up under a minimum of 20 inches Hg vacuum for 5–10 minutes.

Bagging Procedure

Identical procedure as described in Example 1.

Autoclave Cure Process

Identical procedure as described in Example 1.

Post Polymerization/Post Cure Process

Post polymerization/post curing was carried out using the procedure as described in the Example 1 (10 hours hold at 725° F.). The dry glass transition temperature (Tg) was observed to increase from 692° F. (as autoclave cured) to 762° F. (post cured).

Fabrication of Advanced Composite

The tool of this example was utilized to process a composite part requiring a high cure temperature. A unidirectional prepreg tape, as in Example 1, was layed-up to prepare a 24 plies part with the following fiber orientation repeated three times:

$(+45/\ 0°/-45°/90°/90°/-45°/0°/+45)$

The tool surface of this example was sprayed with the high temperature release agent (Freekote-33) and hot air dried each time to assure good release of the part after cure. The lay-up was then placed on the tool, vacuum bagged using the procedure already described and then autoclave cured using the following procedure:

1. Apply 5 inches Hg. vacuum.

2. Heat the part/assembly to 239° F. at 2° F. per minute.

3. Apply 28 inches Hg vacuum while the part/assembly is at 239° F.

4. Heat the part/assembly from 239° F. to 680° F. at 2° F. per minute.

5. Hold the part/assembly at 680° F. for 30 minutes.

6. Pressurize to 200 psi; hold 50 minutes at 680° F.

7. Cool the part assembly to 370° F. at 2° F. per minute.

8. Release the pressure and vacuum and remove the part/assembly from the autoclave.

The part produced had excellent quality and good mechanical, i.e., flexural strength and modulus, and thermal properties (Table 2).

TABLE 1

| TOOLING PREPREGS | | | | |
|---|---|---|---|---|
| PREPREG | A | B | C | D |
| Thickness, mils | 14.0 | 25.0 | 37.0 | 9.0 |
| Weave Style | Plain | 4HS | 4HS | Plain |
| Counts, yarns/in. | 12 × 12 | 12 × 12 | 10 × 10 | 24 × 24 |
| Width, Inches | 50 | 50 | 50 | 50 |
| Cured Ply Thickness, Vacuum bag, mils | 8.0 | 15.0 | 26.0 | 4.0 |
| Impregnated Fabric Fiber Volume, % | 53–55 | 54–56 | 53–56 | 51–52 |
| Fiber Areal Weight, gm/m$^2$ | 181–184 | 371–374 | 618–647 | 121 |
| Resin Content, % | 40–42 | 39–40 | 37–42 | 44 |
| Volatiles, % | 14–15 | 16–17 | 14–17 | 14 |

TABLE 2

| COMPOSITE PART PROPERTIES | |
|---|---|
| Density, gm/cc | 1.54 |
| Fiber Volume, % | 56 |
| Fiber Weight, % | 63.9 |
| Resin Weight, % | 36.1 |
| Void Level, % | 1.6 |
| Glass Transition Temperature, °F. | 570 |
| TGA Weight Loss (up to 750° F.), % | 0.0 |

I claim:

1. A method for preparing a composite tool suitable for fabricating composite articles of high Tg comprising forming a lay-up of prepregs containing carbon fiber reinforcement and substantially stoichiometric quantities of a mixture of diamines consisting essentially of about 95% p-phenylene diamine with the remainder m-phenylene diamine and 2,3-bis-(3',4'-dicarboxyphenyl)hexafluoropropanol in an amount sufficient to produce 35 to 45 volume % of polyimide in the prepreg upon curing, enclosing the lay-up in a vacuum bag, heating the lay-up to a temperature in the range of about 650° to 730° F. while pulling a vacuum on the contents of the bag and while applying a pressure on the bag at least 180 pounds per square inch to cure the assembly until the Tg of the composite tool is between 650° and 700° F., releasing the pressure and vacuum and post curing the assembly to increase Tg by heating in a recirculating air oven to a temperature of at least 700°–725° F. until the Tg of the composite tool reaches at least 730° F.

2. A composite tool for manufacture of fiber reinforced high temperature composite parts comprising from 35 to 45 volume % of a polyimide consisting essentially of the following recurring structural units:

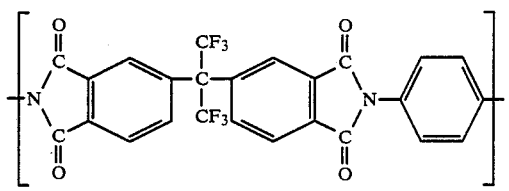

and

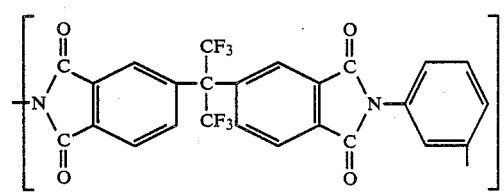

wherein A is present in an amount of about 95% and B the remainder, and from 55 to 65 volume % of carbon fiber reinforcement, said tool having a porosity of less than 6% and a Tg of at least 730° F.

3. A composite tool in accordance with claim 2 which has a surface layer of the same polyimide reinforced with a 24×24 yarns/inch fabric of about 1000 filament carbon fiber, and wherein the proportion of fiber to matrix is substantially the same as in the body of the tool.

4. A composite tool in accordance with claim 2 which has a surface layer of a polyimide film of between 0.2 and 0.75 mils thick, said polyimide being formed from oxydianiline and pyromellitic dianhydride.

* * * * *

UNITED STATES PATENT OFFICE
CERTIFICATE OF CORRECTION

PATENT NO. : 4,851,280
DATED : July 25, 1989
INVENTOR(S) : Dipak Gupta

It is certified that error appears in the above-identified patent and that said Letters Patent is hereby corrected as shown below:

Column 2 line 54 cancel "2,3" and insert --2,2--
line 55 cancel "propanol" and insert --propane--

Claim 1 line 7 cancel "2,3" and insert --2,2--
Claim 1 line 8 cancel "phenyl)hexafluoropropanol" and insert --phenyl)hexafluoropropane--

Signed and Sealed this

Twenty-ninth Day of May, 1990

Attest:

HARRY F. MANBECK, JR.

Attesting Officer    Commissioner of Patents and Trademarks